Nov. 20, 1962
H. MITTAG
3,065,400
GENERATOR INSTALLATION
Filed April 5, 1960
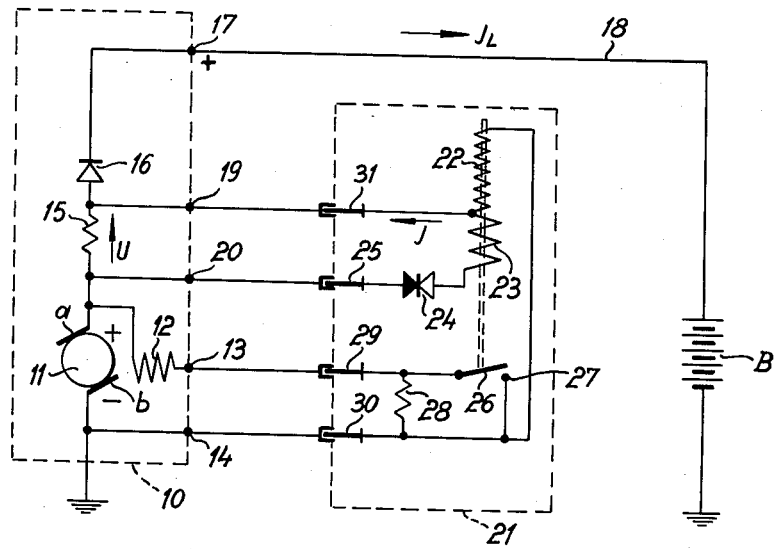
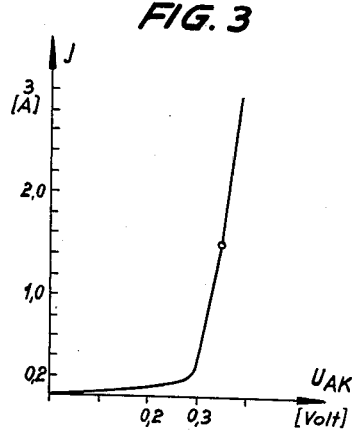
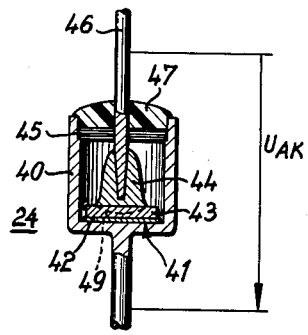
INVENTOR
Hermann Mittag
by Michael S. Striker United States Patent Office 3,065,400
Patented Nov. 20, 1962

3,065,400
GENERATOR INSTALLATION
Hermann Mittag, Stuttgart-Botnang, Germany, assignor to Robert Bosch G.m.b.H., Stuttgart, Germany
Filed Apr. 5, 1960, Ser. No. 20,201
Claims priority, application Germany Apr. 11, 1959
8 Claims. (Cl. 322—25)

The present invention concerns generator installations and is particularly applicable to lighting plants for vehicles, particularly for automotive vehicles, comprising a shunt-wound generator and an electromagnetic regulator device operating according to the Tirill system and including an electromagnetic relay having a voltage coil connected for being energized by the output voltage which is to be regulated, and having also an auxiliary current coil in series with a non-linear semi-conductor element, the last mentioned series combination being connected in parallel with a low-resistance resistor which is connected in the output line of the generator.

In known devices of this type the load current delivered at the output of the generator flows through a resistor which is conventionally mounted on a housing containing the regulator device. It has been found that the heat inevitably developed in this resistor is likely to heat the electromagnetic relay of the regulator device during operation. However, such a rise in temperature of the relay coils and particularly in the voltage coil is bound to change the ohmic resistance of that coil and thereby changes the predetermined current-voltage characteristic thereof so that under such circumstances the relay would regulate the voltage output of the generator to an undesirable high value.

It is therefore a main object of this invention to provide for an arrangement in which this difficulty is safely avoided.

It is another object of this invention to provide for such an arrangement in which the regulating device can be arranged remote from the generator.

With above objects in view a generator installation according to the invention comprises, in combination, a generator unit including as components a rotor, a shunt winding connected at one end with one terminal of said rotor, a control resistor of predetermined resistance connected in series with said one terminal of said rotor, and first housing means surrounding said rotor, shunt winding and control resistor for thermally separating said components of said generator unit from the surrounding air; a regulator unit including regulating means for regulating, in accordance with a predetermined current-voltage characteristic at a given temperature, the output of said generator unit depending on variations of the load thereof, and second housing means surrounding said regulating means and arranged remote from said first housing means for preventing said characteristic from being affected by heat emanating from said generator unit when in operation; and circuit means for connecting said rotor, and the other end of said shunt winding and said control resistor with said regulating means.

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawings, in which:

FIG. 1 is a schematic circuit diagram illustrating an installation according to the invention;
FIG. 2 illustrates on a larger scale, one component of the installation of FIG. 1; and
FIG. 3 is a diagram illustrating the current-voltage characteristic of the component illustrated by FIG. 2.

The installation according to FIG. 1 contains a direct current generator 10, the rotor 11 of which is mechanically coupled in a well known manner with a motor, e.g. the engine of a motor vehicle, for being rotated, in the case of a motor vehicle installation at rotary speeds varying greatly corresponding to the varying speeds of the engine or the vehicle. The positive terminal or brush $a$ of the rotor is connected with one end of the exciter winder 12. The other end of the exciter winding is connected with a terminal 13 mounted on the outside of the housing 10 of the generator unit. The minus terminal or brush $b$ of the rotor 11 is grounded and additionally connected with a terminal 14 mounted similarly on the outside of the housing 10. Connected in series with the brush $a$ is a control resistor 15. This resistor 15 has a predetermined resistance value of e.g. approximately .006 ohm and is so dimensioned that it is capable of carrying the entire output current $J_L$ of the generator. This load current flows through a rectifier or equivalent check valve 16 which serves as a return-current cutout and consists of semi-conductor material. From the check valve 16 the current flows to the output terminal 17 mounted also on the outside of the generator housing 10 and carrying positive potential. From there a line 18 leads for instance to a storage battery B serviced by the generator, and from the battery B other current consuming equipment e.g. headlights, signalling devices etc. of a vehicle may be supplied with energy.

In order to keep the voltage output of the generator at a practically uniform level of e.g. 6.3 volts, irrespective of varying rotary speeds of the generator and of the varying amount of the delivered load current $J_L$ a regulator unit 21 as illustrated in FIG. 1 is provided. This regulator unit preferably has a housing made of thermoplastic synthetic material the shape of which is irrelevant. On the outside of this housing four terminals, preferably in the form of mutually insulated plugs 25, 29, 30 and 31 are mounted. For connecting the regulator unit with the terminals 13, 14, 19, 20 of the generator unit in the manner described below, suitable connector sockets may be mounted in engagement with the above mentioned plugs. The housing 21 of the regulator unit surrounds an electromagnetic relay which has a voltage coil 22 made up of about 1200 turns of thin wire and is connected for energization by the generator output voltage as will be described below. In addition, the relay has an auxiliary current coil 23. This latter coil is made up of about 100 turns of a substantially heavier copper wire. In this example one end of coil 22 is directly connected with one end of the coil 23. The free end of the coil 23 is connected in series with a non-linear semi-conductor element 24 described in detail further below, the other electrode of which is connected with the plug 25.

The electromagnetic relay further comprises a normally closed switch having a movable switch member 26 cooperating with a stationary contact 27. The arm 26 is biased by a spring not shown for assuming normally the position in which it engages the contact 27. A second control resistor 28 is connected in parallel with the switch 26, 27 so that the resistor 28 is normally short-circuited by the closed switch 26, 27, i.e., as long as the relay is not energized. However, when through energization of the relay the arm 26 is disengaged from contact 27, the resistor 28 is connected in series with the exciter winding 12 through the shown connections between terminal 13 and plug 29, and between terminal 14 and plug 30, as shown. Hereby the exciter current flowing through the winding 12 is kept at a very low value.

FIGURE 2 illustrates the semi-conductor element 24 at a larger scale. This element has a cup-shaped cooling member 40 made by extrusion from a copper disc and having for instance a diameter of 6 mm. and a height of about 7 mm. Inside the cup a semi-conductor disc 43 of about .3 mm. is soldered to the bottom 41 by means of a tin disc 42. For producing the semi-conductor disc highly purified germanium is used which contains at the most one foreign atom for $10^9$ to $10^{10}$ germanium atoms. This germanium material is melted in a crucible under addition of antimony and obtains through this addition of antimony n-conductivity. In conventional manner a cylindrical monocrystal is drawn from the molten material and contains one antimony atom for $2.5.10^6$ germanium atoms. Therefore it has a comparatively low specific resistance in the range of about .1 ohm cm. The crystal is then cut transversely with respect to its axis whereby discs 43 of .3 mm. thickness are obtained.

On that side of the germanium disc 43 which faces away from the bottom 41 a copper wire 46 is attached by soldering with the aid of a dot 44 of 99.999% pure indium. This wire 46 traverses a central bore of an insulating disc 45 and projects to the exterior of the cup 40. The space existing above the disc 45 is filled with a sealing compound 47.

The assembly of the element 24 is carried out by soldering in one single operation by heating all the components to about 520° to 530° C. in a protective gas atmosphere or in vacuum so that the tin layer 42 located between the semi-conductor disc 43 and the bottom 41 of the cup 40 melts while simultaneously the dot of indium serving as solder for the connecting wire 46 alloys itself with the germanium disc and penetrates into the latter to such a degree that the p-n-layer 49 is formed. At the same time the indium dot having originally a volume of about 4 mm.$^3$ dissolves from the wire 46 about .6 mm.$^3$ of copper. This copper also alloys itself with the indium material and penetrates as far as to the p-n-boundary layer 49. Hereby the semi-conductor element is rendered unsuitable for functioning as a rectifier, but it obtains a considerably steep characteristic above an operating voltage of .3 volt, as is indicated by the diagram of FIG. 3.

In this diagram the operating voltage $U_{AK}$ existing upon application between the connecting wire 46 and the cooling body or cup 40 is plotted as abscissa. The corresponding currents J are plotted as ordinates. The current-voltage characteristic of the semi-conductor element as shown in the diagram indicates that the curve is substantially straight having a small rise up to a voltage of about .2 volt, the current in the conductive direction of the element being .08 amp at .2 volt. When the applied voltage is .25 volt the corresponding current J is about .15 amp, and at .3 volt the current is .3 amp, while at .35 volt the current J increases already to 1.5 amps. It can be seen that the substantial copper content in the soldering material results in a form of the current-voltage characteristic of such a semi-conductor element which displays in the area between .2 volt and .3 volt a distinct break. The steepness $S=dJ/dU$ is, for $U=.2$ volt, at the most 1 a./v. while for $U=.3$ volt the steepness is at least 6 a./v. The illustrated characteristic can be obtained easily by suitably selecting the amount of antimony addition, namely a steepness of only .5 a./v. at .2 volt, however a steepness of already 10 a./v. at .3 volt and even a steepness of about 30 a./v. at .35 volt.

The use of a non-linear semi-conductor element of the type described serves to reduce considerably the generator voltage output whenever the output line 18 should be connected with current consumers having so low a resistance that the load current $J_L$ would assume unadmissibly high values. The result obtained is that such a load current would generate across the control resistor 15 a voltage drop U which then acts as operating potential in the circuit constituted by the element 24 and the current coil 23. If this voltage drop amounts to .3 volt at a current $J_L$ of say 50 amps, then, in accordance with the current-voltage relation illustrated by the characteristic of FIG. 3, a very strong current J would start to flow in response to the voltage $U_{AK}$ applied to the semi-conductor element 24, and this strong current J would energize the current coil 23, in addition to any existing energization of the voltage coil 22, whereby the switch 26, 27 is opened. This control current J increases approximately linearly up to the above-mentioned load current value $J_L$ of 50 amps., but it increases much faster than the load current $J_L$ as soon as the voltage drop U generated by the load current exceeds the value of .3 volt. Hereby through the action of the relay the generator excitation and therefore the voltage output of the generator are reduced to such a degree that the above mentioned maximum permissible value of the load current cannot be exceeded so that the generator is in this manner protected against overload.

The operation of the regulator unit in response to voltage variation in the generator output i.e., the function of the voltage coil 22 does not require any further explanation because it is rather conventional and also evident from the diagram of FIG. 1.

It will be appreciated that the arrangement as described and shown, with all the components including the control resistor 15 being enclosed within the generator unit 10, and all the elements of the regulating means being enclosed in the housing of the regulator unit 21, the two housings being arranged remote from each other, any undesirable thermal effect of heat developed in the unit 10 on the characteristic of the regulating device 21 is safely eliminated.

It will be understood that each of the elements described above or two or more together, may also find a useful application in other types of generator installations differing from the types described above.

While the invention has been illustrated and described as embodied in a generator installation having a shunt-wound generator and a regulator device, it is not intended to be limited to the details shown, since various modifications and structural changes may be made without departing in any way from the spirit of the present invention.

Without further analysis the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed and desired to be secured by Letters Patent is:

1. In a generator installation, in combination, a generator unit including as components a rotor, a shunt winding connected at one end with one terminal of said rotor, a control resistor of predetermined resistance connected at one end in series with said one terminal of said rotor, and a load output terminal connected in circuit with the other end of said control resistor and first housing means surrounding said rotor, shunt winding and control resistor for thermally separating said components of said generator unit from the surrounding air; a regulator unit including regulating means for regulating, in accordance with a predetermined current-voltage characteristic at a given temperature, the output of said generator unit depending on variations of the load thereof, and second housing means surrounding said regulating means and arranged remote from said first housing means for preventing said characteristic from being affected by heat emanating from said generator unit when in operation; and a plurality of circuit means for connecting the two terminals of said rotor, the other end of said shunt winding and the two ends of said control resistor, respectively, with said regulating means.

2. In a generator installation, in combination, a generator unit including as components a rotor, a shunt winding connected at one end with one terminal of said rotor, a series-combination of a control resistor of predetermined resistance, a return-current check valve connected in series with said one terminal of said rotor, and a load current output terminal connected to the output terminal of said check valve, and first housing means surrounding said rotor, shunt winding, check valve and control resistor for thermally separating said components of said generator unit from the surrounding air; a regulator unit including regulating means for regulating, in accordance with a predetermined current-voltage characteristic at a given temperature, the output of said generator unit depending on variations of the load thereof, and second housing means surrounding said regulating means and arranged remote from said first housing means for preventing said characteristic from being affected by heat emanating from said generator unit when in operation; and a plurality of circuit means for connecting the two terminals of said rotor, the other end of said shunt winding, and the two terminals of said control resistor, respectively, with said regulating means.

3. In a generator installation, in combination, a generator unit having an output terminal including as components a rotor having a first terminal and a grounded second terminal, a shunt winding connected at one end with said first terminal of said rotor, a series-combination of a control resistor of predetermined resistance, a return-current check valve connected in series with said first terminal of said rotor to said output terminal, and a load current output terminal connected to the output terminal of said check valve, and first housing means surrounding said rotor, shunt winding, check valve and control resistor for thermally separating said components of said generator unit from the surrounding air; a regulator unit including regulating means for regulating, in accordance with a predetermined current-voltage characteristic at a given temperature, the output of said generator unit depending on variations of the load thereof, said regulating means including relay means having a voltage coil as well as a current coil and a normally closed switch operable by either one of said coils upon energization thereof, and a second control resistor connected in parallel with said switch so as to be short-circuited thereby when the latter is in closed position, and second housing means surrounding said regulating means and arranged remote from said first housing means for preventing said characteristic from being affected by heat emanating from said generator unit when in operation; and first circuit means for connecting said grounded terminal of said rotor and the other end of said shunt winding in series with said second control resistor so as to complete the circuit of said shunt winding, second circuit means for connecting said current coil in parallel with said first mentioned resistor, and third circuit means for connecting said voltage coil in parallel with the series-combination consisting of said rotor and said first mentioned control resistor.

4. In a generator installation, in combination, a generator unit having an output terminal including as components a rotor having a first terminal and a grounded second terminal, a shunt winding connected at one end with said first terminal of said rotor, a series-combination of a control resistor of predetermined resistance, a return-current check valve connected in series with said first terminal of said rotor to said output terminal, and a load current output terminal connected to the output terminal of said check valve, and first housing means surrounding said rotor, shunt winding, check valve and control resistor for thermally separating said components of said generator unit from the surrounding air; a regulator unit including regulating means for regulating, in accordance with a predetermined current-voltage characteristic at a given temperature, the output of said generator unit depending on variations of the load thereof, said regulating means including relay means having a voltage coil as well as a current coil and a non-linear semi-conductor element series-connected with the latter, and a normally closed switch operable by either one of said coils upon energization thereof, and a second control resistor connected in parallel with said switch so as to be short-circuited thereby when the latter is in closed position, and second housing means surrounding said regulating means and arranged remote from said first housing means for preventing said characteristic being affected by heat emanating from said generator unit when in operation; and first circuit means for connecting said grounded terminal of said rotor and the other end of said shunt winding in series with said second control resistor so as to complete the circuit of said shunt winding, second circuit means for connecting said series-connected current coil and semi-conductor element in parallel with said first mentioned resistor, and third circuit means for connecting said voltage coil in parallel with the series-combination consisting of said rotor and said first mentioned control resistor.

5. An installation as claimed in claim 4, wherein said first housing means is provided with additional terminals respectively connected inside said first housing means with said grounded terminal of said rotor, with said other end of said shunt winding, with a junction point between said first terminal of said rotor and one end of said first mentioned control resistor, and with the other end of said first mentioned control resistor, said first, second and third circuit means being correspondingly connected at one end thereof with said additional terminals, respectively.

6. An installation as claimed in claim 5, wherein said second housing means is provided with a set of terminals respectively connected inside said second housing means with the ends of said second control resistor, with the ends of said current coil, and with the ends of said voltage coil, said first, second and third circuit means being correspondingly connected at the other end thereof with said set of terminals, respectively.

7. An installation as claimed in claim 6, wherein said set of terminals and the respective other ends of said circuit means are formed as plug-and-socket connections.

8. An installation as claimed in claim 7, wherein said second housing means comprises enclosure means made of thermoplastic synthetic material.

References Cited in the file of this patent

UNITED STATES PATENTS

| 2,617,907 | Umbarger et al. | Nov. 11, 1952 |
| 2,707,263 | Jorgenson | Apr. 26, 1955 |
| 2,927,261 | Mittag | Mar. 1, 1960 |